United States Patent [19]

Mahboob

[11] Patent Number: 5,405,632

[45] Date of Patent: Apr. 11, 1995

[54] PROCESS FOR THE PRODUCTION OF LOW FAT MEATS

[76] Inventor: Saba Mahboob, 1014 Aster Blvd., Rockville, Md. 20850

[21] Appl. No.: 106,564

[22] Filed: Aug. 16, 1993

Related U.S. Application Data

[63] Continuation-in-part of Ser. No. 903,083, Jun. 15, 1992, abandoned, which is a continuation-in-part of Ser. No. 760,332, Sep. 16, 1991, abandoned, which is a continuation-in-part of Ser. No. 697,286, Apr. 2, 1991, abandoned.

[51] Int. Cl.$^6$ .......................... A23L 1/31; A23L 1/317
[52] U.S. Cl. .................... 426/243; 426/417; 426/641; 426/646
[58] Field of Search ............... 426/241, 242, 243, 246, 426/417, 480, 520, 523, 641, 646

[56] References Cited

U.S. PATENT DOCUMENTS

| | | | |
|---|---|---|---|
| 2,980,544 | 4/1961 | Mills | 426/241 |
| 3,674,504 | 7/1972 | Lane | 426/243 |
| 3,780,191 | 12/1973 | Langer | 426/480 X |
| 3,906,115 | 9/1975 | Jeppson | 426/243 |
| 4,353,929 | 10/1982 | Flavan et al. | 426/243 |
| 4,847,099 | 7/1989 | Elinsky | 426/417 X |
| 4,948,607 | 8/1990 | Margolis | 426/417 X |
| 4,980,185 | 12/1990 | Small | 426/417 |

*Primary Examiner*—Arthur L. Corbin

[57] ABSTRACT

Raw meat is heated to form a meat juice containing fat and nutrients, the heated meat is separated from the meat juice, the meat juice is separated into a fat layer and an aqueous layer containing nutrients, the aqueous layer is added to the previously heated meat to form a mixture and the mixture is heated so that the meat absorbs the aqueous layer to produce a low fat meat product.

7 Claims, No Drawings

PROCESS FOR THE PRODUCTION OF LOW FAT MEATS

This application is a continuation in part of my prior application Ser. No. 07/903,083, filed on Jun. 15, 1992, now abandoned, which is a continuation-in-part of Ser. No. 07/760,332, filed on Sep. 16, 1991, now abandoned; which was a continuation-in-part of Ser. No. 07/697,286, filed on Apr. 2, 1991, now abandoned.

BACKGROUND OF THE INVENTION

Several studies have reported association between dietary lipids and the risk of coronary heart disease. Apart from genetic factors, high fat and cholesterol content of the American diet has been considered a leading cause of coronary heart disease. Controlling the amount of cholesterol and fat in the diet is important in preventing coronary heart disease.

Conventional methods of cooking meat do not decrease the amount of fat in the cooked meat dishes to a desirable low level of fat as shown in table 1, arranged on the basis of information published in the USDA Handbook Number May 8–13, 1990.

The data in table 1 illustrate that when three grades of raw ground beef are cooked, by several methods, a substantial amount of fat is left behind in the cooked meat.

TABLE 1

Fat content of raw ground beef and cooked beef products.
See table 2, for comparison of results.

|  | Fat in grams | Retention of the original fat in product. |
|---|---|---|
| Beef, ground, regular | | |
| Raw, 100 g | 26.55* | |
| Product from 100 g raw | | |
| Broiled, medium, | 20.69 | 77.9% |
| Broiled, well done | 19.46 | 73.3% |
| Baked, medium, | 20.93 | 78.8% |
| Baked, well done | 21.47 | 80.8% |
| Pan-fried, medium | 22.56 | 85.0% |
| Pan-fried, well done | 18.92* | *71.26% |
| Beef, ground, patties, frozen | | |
| Raw, 100 g | 23.19** | |
| Broiled, medium | 19.65** | **74.01% |
| Beef, ground, extra lean, | | |
| Raw, 100 g | 17.06*** | |
| Baked, medium | 16.14 | 94.6% |
| Baked, well done | 15.98 | 93.7% |
| Broiled, medium | 16.33 | 95.7% |
| Broiled, well done | 15.80** | ***92.61% |
| Pan-fried, medium | 16.42 | 96.2% |
| Pan-fried, well done | 15.95 | 93.5% |

PRIOR ART

Methods of producing lean meat by modifying or supplementing animal feeds have been described by Asato and Lawrence in U.S. Pat. No. 4,649,158 Mar. 10, 1987, by Gardner-Carimi et al in U.S. Pat. No. 4,780,327, Oct. 25, 1988, by Baker in U.S. Pat. No. 4,792,546, Dec. 20, 1988 and by Hofmeister in U.S. Pat. No. 4,826,692, May 2, 1989.

Hohenster and Hohenster described a process for preparing low fat meat products (sausages) in U.S. Pat. No. 4,504,515, Mar. 12, 1985. Kezler describes a process for bacon-like meat products of reduced fat content in U.S. Pat. No. 3,890,451, Jun. 17, 1975 and in U.S. Pat. No. 4,057,650, Nov. 8, 1977. Methods for separating fat from lean meat are described by Langer and Langer in U.S. Pat. No. 3,780,191, Dec. 18, 1973. Roth describes the separation of fat from frozen beef in U.S. Pat. No. 4,201,302, May 6, 1980. Olson and Podebradsky describe a method for meat products with high polyunsaturated fat content in U.S. Pat. No. 3,649,300, Mar. 14, 1972.

In U.S. Pat. Nos. 3,614,365, Oct. 19, 1971 and 3,674,504, Jul. 4, 1972 Lane described the use of infrared and microwave energy to preheat and cook bacon, but he, like several other inventors, did not use these heat sources to separate the harmful fat from the meat.

Jeppson, in U.S. Pat. No. 3,906,115, Sep. 16, 1975 described an elegant mass production method with a highly mechanized system for preparation of "Precooked Heat and Serve Meats" using steam, hot air, microwave energy and hot air for drying. Jeppson described the use of microwave energy and the production of meat fat as a byproduct. Jeppson described the use of microwave to heat and serve bacon, sausage, spareribs, strips of beef, turkey, ham, fish and to salvage fats from butchering operations.

Flavan, Jr., et al in U.S. Pat. No. 4,353,929, Oct. 12, 1982 described an elaborate mechanized scheme and apparatus, electrically heated, to enable a busy chef to cater to several different orders of various meats within a reasonable time. Although the patent refers to radiation and electric current of cooking meat, it did not make use of heat or electromagnetic radiation specifically for separating fats from the meat.

Elinsky in U.S. Pat. No. 4,847,099, Jul. 11, 1989 described an apparatus and method for defatting and cooking meat. The principal feature of this process is that the meat surface is never contacted by a source of heat in excess of approximately 100° C. Elinsky's invention concerns the pot used for steaming the meats which leads to separation of some fat during the cooking process.

Geoffrey Margolis in U.S. Pat. No. 4,948,607, Aug. 14, 1990 described an elaborate apparatus for removing fat from hamburgers as a continuous large scale process in which pressure is applied to expel the fat from the hamburger. This elaborate process used electrical energy and not electromagnetic radiation of a certain frequency. Margolis did not return the nutrients to the hamburgers.

Small in U.S. Pat. No. 4,980,185, Dec. 25, 1990 described a method for reducing the cholesterol and saturated fat content of red meat and fowl.

SUMMARY OF THE INVENTION

The purpose of this invention is to further reduce the amount of fat in cooked meat without compromising the nutritional integrity of the product.

This invention relates to a general process for the production of low fat meats and to the products obtained. The process consists of heating the meats, in a dish, alone or with water to coagulate the meat proteins and to disrupt the lipid-protein bonds. The meat to be processed, for example, a pound of steak, is placed in a dish and treated with heat at a temperature and for a time period sufficient to liquefy the fat and to allow it to flow out of the meat along with meat juice. The liquid juice, including the saturated and unsaturated fat, is recovered in the dish.

In one embodiment of this invention, a mixture of ground meat and water is heated on an open stove in a saucepan and stirred frequently. If the source of heat is electromagnetic radiation then the meat is placed in a covered dish, heated and stirred. When ground meat patties are heated, the heating process is interrupted, the meat patties are turned over, and the above process is repeated. Alternatively the meat may be rotated about one or both of its horizontal axes while it is heated to ensure even heating and defatting.

The liquid in the dish that is recovered from the aforesaid treatment, is allowed to settle in two layers. The aqueous layer is removed and returned to the meat. Alternatively the liquid could be centrifuged, the fat layer siphoned, or simply poured to separate the fat. The aqueous phase is separated from the liquid fat and returned to the meat, to restore the useful nutrients to the meat. This mixture of meat and the aqueous fat-free liquid is allowed to simmer until the liquid is absorbed by the heated meat. The liquid may be returned to the meat by injection, by soaking the meat, or in any other suitable way.

While not wanting to be bound by any specific theory, it is believed that when electromagnetic radiation is used it increases the rotational movement of the water molecules, which produces heat which perhaps releases the fat at a moderate temperature. The fat, eliminated from the meat by this process, solidifies at room temperature. Thus by subjecting raw meat to this process the total fat content of the meat is diminished by about 75% of the amount of fat initially present in the raw meat containing 27% of fat.

In another version of the process ground meat with water, seasoning and spices is heated slowly at atmospheric pressure to about 95° C. and the temperature is held between 95°–97° C. with stirring until the opaque liquid becomes clear. The heated meat is then strained, and pressed to expel the liquid. The liquid is allowed to settle into two layers. The aqueous layer is returned to the ground meat and allowed to simmer until all the liquid is absorbed by the cooked meat thus making sure no nutrients are lost during the process, in which 53% of the original fat has been isolated.

In a further modification of the present method meat, such as stew beef and pot roast are heated under pressure for a suitable time and allowed to cool to 60°–70° C. The aqueous phase is separated from the fat and returned to the meat and absorbed in the meat by heating the mixture gently. About 49% of the fat present in the meat was isolated.

The purpose in removing the excess fat is to reduce the amounts of cholesterol, myristic and palmitic acids and to make sure that sufficient amounts of essential fatty acids, including linoleic, gamma lenolenic and arachidonic acid are left behind in the processed meat.

Results of analyses of fat in raw meat specimens and the product obtained from them are presented in table 2. These specimens were representative of the raw meat used and the products obtained. The fat eliminated from meat in these experiments was also analyzed. The data in tables 3–11 show that the goal of reducing the total amount of fat, myristic and palmitic acids and trans 18:1 and 18:2 has been achieved along with 17.47 to 30% decrease in the amount of cholesterol reported in the raw regular and extra lean ground beef. The methods used were simple and inexpensive and are capable of adaptation to large scale production. Furthermore, if necessary, the process makes it possible to separate and return unsaturated fat to the product.

TABLE 2

Total Fat content of the products of methods 1, 3–5.

| Raw Meat g | Fat g | Product g | Fat in Product g | Product Fat % | Original fat retained |
|---|---|---|---|---|---|
| 100 | 26.55* | 52.6 | 6.59 | 12.5* | *25.4% |
| 100 | 18.89 | 62.5 | 7.18 | 11.49 | 38.0% |
| 100 | 17.53 | 71.5 | 4.26 | 5.96 | 24.3% |
| 100 | 17.06*** | 67.8 | 4.96 | 7.3*** | ***29.1% |
| 100 | 14.64 | 80.6 | 5.77 | 7.16 | 39.3% |
| 100 | 12.58 | 70.0 | 5.47 | 7.81 | 43.0% |
| 100 | 7.60 | 60.32 | 4.18 | 6.93 | 55.0% |
| +100 | 27.43 | 52.6 | 9.23 | 17.55 | 39.6% |

+pork FIGS. with 1, 2, and 3 asterisks in tables 1–2 compare fat decrease.

Comparison of the fat content of the products, in tables 1–2 (marked by asterisks), prepared by conventional cooking method with the fat content of the products obtained by my process shows that my process gives products with lower fat content. When raw meat with a fat content of 26.55%* is cooked by conventional methods the products have *18.92 to 22.56 grams of fat and at least 71.2% of the fat is retained, whereas method 5 of my process yields a product with 12.5* g fat; and only 25.4*% of the fat is retained. Similarly extra lean ground beef of 17.06*% fat content yields products with 15.80* to 16.42 grams of fat and at least *92.6% fat is retained in the product. Method 3 of my process gives a product with 4.96 grams of fat and ***29.1% of the original fat is retained.

DESCRIPTION OF THE METHODS AND EXAMPLES

Method 1

Comprises placing the raw meat pieces such as stew meat, pot roast and some steaks in a dish, which is heated in a pressure cooker at pressure of 5–15 psi (109°–121° C., 228°–250° F.) for a suitable length of time, usually up to 5–15 minutes but longer for tough meats. The length of time is determined by the amount and cut of the meat. No water is added to the meat but a small amount of water is placed in the pressure cooker before heating. After heating the pressure cooker is allowed to cool until the pressure becomes equal to the atmospheric pressure. Meat pieces are picked out and the warm juice containing the separated fat is poured from the dish into a separatory funnel through a regular funnel lined with four layers of cheese cloth or gauze. The liquid fat layer rises to the top. The bottom aqueous layer is returned to the cooked meat and gently heated until the juice (without fat) is absorbed by the meat. Care is taken not to overheat or overdry the meat. Before heating, the meat can be placed in the dish with water or put directly with water in the pressure cooker.

In table 3 the average amount of fat recovered in experiments 1, 4 and 5 was 3.6±0.6% of the raw meat. For experiments 2, 3 and 6 the average fat was 1.4±0.14% of the raw meat. In experiments 7–11 with "lean" stew beef, the average yield of fat was 0.48±0.10% of the raw meat. Analysis of raw stew beef gave a fat content of 7.6% and of the product 4.81% Same lot of stew beef was used in experiments 7–11 and the experiments were performed the same day.

Abreviations used in the tables

SFA = saturated fatty acids 14:0 to 18:0 carbon acids with no double bonds.

TSFA = total saturated fatty acids. 14:1 = one double bond in a 14 carbon acid, 20:4 = four double bonds in a 20 carbon acid.
UFA = unsaturated fatty acids.
TUFA = total unsaturated fatty acids.
Chol = cholesterol

TABLE 3

| | Examples of method 1 | | | |
|---|---|---|---|---|
| Raw Meat | Water added ml/g | Aqueous Juice ml/g | Product yield % | Fat yield % |
| 1. Chuck, 657 g salt 6 g | 0.57 | 0.7 | 47.4 | 4.3 fatty tissue 61 g |
| 2. Choice 550 g salt 4 g | 0.27 | 0.63 | 58.0 | 1.46 |
| 3. Chuck 500 g, no salt | 0.1 | — | 60.0 | 1.54 fatty tissue 30 g |
| 4. Chuck blade 1 Kg no salt | 0.1 | — | 58.0 | 3.1 fatty tissue 72 g |
| 5. Chuck 690 g, frozen | none | 0.47 | 53.0 | 3.3 fatty tissue 51 g |
| 6. Chuck 930 g salt 2 g | none | 0.36 | 50.0 | 1.3 |
| 7. Lean stew 190 g | none | — | 63.0 | 0.53 |
| 8. Lean stew 181 g | none | — | 63.0 | 0.55 |
| 9. Lean stew 194 g | none | — | 59.0 | 0.31 |
| 10. Lean stew 208 g | none | — | 57.0 | 0.48 |
| 11. Lean stew 187 g | none | — | 60.0 | 0.54 |
| 12. Beef rib 476 g | none | 0.176 | 75.8 | 7.5 fatty tissue 15 g |
| 13. Beef rib eye steak, 252 g | none | 0.873 | 44.8 | 9.5 fatty tissue 29 g |
| 14. Beef sirloin steak, lean 554 g | none | 0.574 | 46.9 | 4.4 fatty tissue 46 g |
| 15. Beef round top steak, 434 g | none | 0.357 | 49.5 | 2.07 fatty tissue 23 g |
| 16. Beef top sirloin 465 g | none | 0.344 | 52.5 | 5.05 fatty tissue 39 g |
| 17. Beef loin strip 315 g | none | 0.333 | 49.8 | 7.6 fatty tissue 28 g |

In experiments where no water was added the meat was placed in a dish and the dish was placed in the pressure cooker contaimg water and heated at 10–15 psi for 10–20 minutes. Please see Table 4 for fatty acid composition of the fat pooled from experiments 7–11.

TABLE 4

| Fatty acid composition of raw and processed stew beef | | | |
|---|---|---|---|
| Meat 100 g | Raw | Product 60.4 g | Decrease in fat |
| Fat | 7.60 | 4.18 | 45% |
| SFA | | | |
| 14:0 | 0.02 | 0.14 | |
| 15:0 | 0.03 | 0.02 | |
| 16:0 | 1.58 | 0.79 | |
| 17:0 | 0.07 | 0.06 | |
| 18:0 | 0.69 | 0.37 | |
| TSFA | 2.39 | 1.27 | 38.22% |
| UFA | | | |
| 14:1 | 0.07 | 0.03 | |
| 16:1 | 0.31 | 0.12 | |
| 18:1 | 3.12 | 1.54 | |
| 18:2 | 0.38 | 0.25 | |
| 18:3 | — | — | |
| 20:4 | 0.05 | 0.05 | |
| UFA | 3.93 | 1.94 | 51.22% |

TABLE 4 -continued

| Fatty acid composition of raw and processed stew beef | | | |
|---|---|---|---|
| Meat 100 g | Raw | Product 60.4 g | Decrease in fat |
| Chol. mg | 60.8 | 59.8 | 1.6% |

Molecular configuration of unsaturated fatty acids.

| | Raw Meat | | Product | |
|---|---|---|---|---|
| | cis | trans | cis | trans |
| 18:1 | 2.80 | 0.32 | 2.30 | 0.26 |
| 18:2 | 0.32 | 0.04 | 0.40 | 0.0 |

Method 2

This method is concerned with the separation of fat from several cuts of raw meat using electromagnetic radiation or microwave energy as a heat source. The method consists of placing the meat pieces in a dish with water and exposing them to electromagnetic radiation at 625 to 700 Joules per second at a frequency of 2450 MHz for a suitable time which is determined by the tenderness of the cut and its quantity. The broth containing the fat is poured into a vessel or a separatory funnel, the bottom aqueous layer is withdrawn and added to the previously heated meat and cooked until the juice is absorbed by the meat.

Example of Method 2

Sandwich steak 280 g, in 30 ml water (0.107 ml per gram of meat), was treated with electromagnetic radiation at 625 Joules per second for a total of two minutes, turned over and the treatment repeated five times (total of 12 minutes in six steps). The aqueous juice was allowed to separate from the fat. Aqueous juice, 0.357 ml per gram of steak, was added back to the steak and cooked gently until all juice was absorbed. Yield of the product 167 g or 60.7%. Fat yield was 0.36%.

Beef cubed steak, low fat cut, 269 g, was treated as above in a microwave oven for a total of ten minutes without any added water, juice produced 0.204 ml per gram of raw meat, fat separated was 0.56% of raw meat and the yield was 56.9% of raw. Lean beef top round steak, 300 g, was heated, without any added water in the microwave oven for eight minutes. Juice recovered was 0.20 ml per gram of raw meat, fat recovered was 0.33% of raw meat and yield of the product was 64.3%.

Method 3

Consists of mixing raw ground meat (with or without added salt or spices etc.) with a suitable quantity of water, 0.1 ml to 0.6 ml per gram of ground meat, gently heating, with stirring, to about 95° C., and holding at 95°–97° C. for 1–2 minutes. The ground beef-water slurry, which is opaque, becomes clear, marking the end of the defatting process. In eighteen experiments with "extra lean" ground beef with 300 to 639 g per experiment yielded between 5.2 and 12.1% fat. The average yield of fat was 8.0±2.0%, indicating that 47% of the total fat present in extra lean ground beef was eliminated. For results obtained by method 3 please see table 5.

TABLE 5

Examples of method 3

| Specimen | Water added mg/ml | Meat yield % | Juice mg/ml | Fat yield % |
|---|---|---|---|---|
| 1. Ground beef, ex. lean, 639 g | 0.29 | 70.9 | 0.69 | 10.6 |
| 2. Ground beef, ex. lean 616 g | 0.61 | 68.9 | 0.76 | 8.3 |
| 3. Ground beef, ex. lean, 625 g | 0.4 | 72.5 | 0.52 | 9.1 |
| 4. Ground beef, ex, lean, 611 g | 0.41 | 74.0 | 0.53 | 10.7 |
| 5. Ground round 500 g | 0.39 | 66.0 | — | 8.0 |
| 6. Ground round 500 g | 0.4 | 70.0 | — | 6.9 |
| 7. Ground beef 300 g | 0.2 | 73.3 | 0.47 | 7.7 |
| 8. Ground beef 300 g | 0.2 | 70.0 | 0.7 | 9.16 |
| 9. Ground beef 300 g | 0.2 | 73.3 | — | 8.5 |
| 10. Ground beef 300 g | 0.2 | 77.6 | — | 8.7 |
| 11. Ground beef 300 g | — | 66.7 | — | 8.3 |
| 12. Ground beef ex. lean 488 g | — | 67.8 | — | 12.1 |
| 13. Ground beef, ex. lean, 570 g | — | 71.0 | — | 6.5 |
| 14. Ground beef ex. lean, 615 g | — | 70.0 | — | 5.5 |
| 15. Ground beef, ex. lean, 537 g | — | 72.6 | — | 5.2 |
| 16. Ground beef, ex. lean, 578 g | — | 66.8 | — | 5.3 |
| 17. Ground beef, ex. lean, 572 g | 0.3 | 74.0 | 0.33 | 6.3 |
| 18. Ground beef, ex. lean, 586 g | 0.3 | 76.6 | 0.46 | 6.4 |

TABLE 6

Fatty acid composition of raw and processed meat by method 3 specimen 8 in table 5

| | Raw 100 g | Product 70 g | Decrease in fat |
|---|---|---|---|
| Fat | 12.58 | 5.47 | 56.5% |
| SFA | | | |
| 14:0 | 0.38 | 0.14 | |
| 15:0 | 0.06 | 0.02 | |
| 16:0 | 2.92 | 0.92 | |
| 17:0 | 0.13 | 0.05 | |
| 18:0 | 1.47 | 0.56 | |
| TSFA | 4.96 | 1.69 | 65.9% |
| UFA | | | |
| 14:1 | 0.13 | 0.05 | |
| 16:1 | 0.52 | 0.21 | |
| 18:1 | 5.26 | 2.15 | |
| 18:2 | 0.37 | 0.02 | |
| 18:3 | — | — | 58.4% |
| TUFA | 6.28 | 3.73 | |
| Chol. mg | 62.5 | 52.15 | 16.56% |

Molecular configuration of unsaturated fatty acids.

| | Raw Meat | | Product | |
|---|---|---|---|---|
| | cis | trans | cis | trans |
| 18:1 | 4.94 | 0.32 | 2.89 | 0.18 |
| 18:2 | 0.32 | 0.05 | 0.25 | 0.03 |

Method 4

In this method three batches of 200 grams extra lean ground beef in 100 ml (0.5 ml per gram of meat) water were treated with electromagnetic radiation at 625 to 700 Joules per second at a frequency of 2450 MHz for one minute, stirred, and the treatment repeated three times. The resulting mixture of meat and juice containing the liquid fat, nutrients and water, was poured over a strainer lined with gauze or cheesecloth. Ground beef was pressed with the bottom of a heavy glass, or a pestle, and then squeezed to expel as much liquid from the treated ground beef as possible. The liquid was poured into a separatory funnel and the fat separated from the aqueous layer. The aqueous layer was added to the heat treated ground beef, from which the juice containing the fat had just been filtered. The mixture of heat treated ground beef and the fat free aqueous layer containing the nutrients was gently cooked, giving moist low fat ground beef. The average fat yield was 11.16±1.02%. Temperature programming with the probe took longer and the temperature readings after stirring were only approximate.

TABLE 7

Fatty acid composition of raw & processed meat method 4

| Meat | Raw 100 g | Product 71.5 g | Decrease in fat |
|---|---|---|---|
| Fat | 17.53 | 4.26 | 75.7% |
| SFA | | | |
| 14:0 | 0.52 | 0.10 | |
| 15:0 | 0.06 | 0.01 | |
| 16:0 | 3.80 | 0.83 | |
| 17:0 | 0.15 | 0.03 | |
| 18:0 | 2.21 | 0.43 | |
| TSFA | 6.74 | 1.4 | 79.2% |
| UFA | | | |
| 14:1 | 0.51 | 0.03 | |
| 16:1 | 0.69 | 0.18 | |
| 18:1 | 7.47 | 1.69 | |
| 18:2 | 0.59 | 0.33 | |
| 20:1 | 0.04 | — | |
| 20:4 | — | 0.04 | |
| Tot. UFA | 9.3 | 2.23 | 76.0% |
| Chol. mg | 64.3 | 48.0 | 25% |

Molecular configuration of unsaturated acids.

| | Raw Meat | | Product | |
|---|---|---|---|---|
| | cis | trans | cis | trans |
| 18:1 | 6.9 | 0.55 | 2.22 | 0.15 |
| 18:2 | 0.54 | 0.10 | 0.23 | 0.03 |

TABLE 8

Fatty acid composition of raw and processed mini patties of extra lean ground beef one of four experiments by method 4

| Meat | Raw 100 g | Product 62 g | Decrease in fat |
|---|---|---|---|
| Fat | 18.89 | 7.18 | 62% |
| SFA | | | |
| 14:0 | 0.57 | 0.2 | |
| 15:0 | 0.07 | 0.02 | |
| 16:0 | 4.15 | 1.48 | |
| 17:0 | 0.17 | 0.05 | |
| 18:0 | 2.43 | 0.81 | |
| TSFA | 7.39 | 2.56 | 65.4% |
| UFA | | | |
| 14:1 | 0.41 | 0.06 | |
| 16:1 | 0.72 | 0.25 | |
| 18:1 | 7.38 | 2.99 | |
| 18:2 | 0.62 | 0.27 | |
| 18:3 | — | — | |
| 20:1 | — | 0.03 | |
| 20:4 | — | 0.03 | |
| TUFA | 9.13 | 3.8 | 58.4% |
| Chol. mg | 61.6 | 53.6 | 13.0% |

Molecular configuration of unsaturated acids:

|  | Raw Meat | | Product | |
| --- | --- | --- | --- | --- |
|  | cis | trans | cis | trans |
| 18:1 | 7.38 | 0.62 | 4.45 | 0.33 |
| 18:2 | 0.54 | 0.08 | 0.38 | 0.05 |

Patties of "extra lean" ground beef (4×50 grams each) in 200 ml water were treated with electromagnetic radiation of the same frequency as described in method 2 for two minutes, turned over, and treated again for two minutes. The patties were lifted, and the liquid was filtered through cheese cloth into a separatory funnel. The aqueous layer was separated from the liquid fat layer, added to the patties and cooked until the liquid disappeared. The yield of fat from four batches was 10.8±1.3%.

Method 5

Twelve groups of "73% lean" ground beef patties, (including meat balls and patties with spices) when treated with electromagnetic radiation at 625 to 700 Joules per second at a frequency of 2450 MHz (the same frequency as mentioned in method 2 and 4), without any added water, gave 16.8±1.6% fat, or 62% of the total fat initially present in the meat.

Two batches each of "extra lean" ground beef patties and meat balls were also treated by electromagnetic radiation of the same frequency as mentioned in method 2 and without adding any water. These showed a loss of 8.8% fat or 51.7% of the total fat initially present.

TABLE 9

Examples of method 5

| Cut & wt. of the specimen | Water added ml/g | Meat yield % | Juice obtained ml/g | Fat yield % |
| --- | --- | --- | --- | --- |
| 1. Ground beef, ex. lean patties 5 × 100 g | none | 78.0 | 0.12 | 4.9 |
| 2. Ground beef, ex. lean 460 g | 0.5 | 86.9 | 0.33 | 5.3 |
| 3. Ground beef, ex. lean 960 g | none | — | — | 8.8 |
| 4. Ground beef, ex. lean 1 kg spicy meat balls | <0.1 | 88.0 | — | 8.9 |
| 5. Ground beef, 73% lean, 680 g meat balls | <0.1 | 73.9 | — | 16.7 |
| 6. Ground beef lean 362 g spicy meat balls | <0.1 | 79.9 | — | 15.8 |
| 7. Ground beef, 73% lean, 4 × 100 g patties | none | 48.0 | — | 16.7 |
| 8. Ground beef, 73% lean 4 × 113 g patties | none | 48.3 | — | 16.7 |
| 9. Ground beef, 73% lean 4 × 113 g patties | none | 51.3 | — | 18.2 |
| 10. Ground beef, 73% lean, 453 g | none | 52.6 | — | 19.96 |
| 11. Ground beef, 73% lean, 453 g spicy patties. | <0.1 | 66.7 | — | 16.3 |
| 12. Ground beef, 73% lean, 453 g spicy | <0.1 | 65.6 | — | 18.3 |
| 13. Ground beef | 0.1 | 69.0 | — | 13.5 |
| 14. Ground beef 73% lean | none | 60.0 | 0.05 | 16.2 |
| 15. Ground beef, 73% lean, 468 g, | none | 56.5 | 0.16 | 16.7 |
| 16. Ground beef 73% lean, 460 g, | none | 58.2 | 0.10 | 16.7 |

Average amount of fat eliminated from 12 specimens (5–16, table 9) of 73% lean ground beef patties and meat balls amounted to 16.8±1.6%.

TABLE 10

Fatty acid composition of raw and processed ground beef patties by method 5.

| Meat | Raw 100 g | Product 52.6 | Decrease in fat |
| --- | --- | --- | --- |
| Fat | 26.55 | 9.23 | 65% |
| SFA |  |  |  |
| 14:0 | 0.80 | 0.25 |  |
| 15:0 | 0.12 | 0.04 |  |
| 16:0 | 6.67 | 2.16 |  |
| 17:0 | 0.26 | 0.08 |  |
| 18:0 | 3.58 | 1.13 |  |
| TSFA | 11.69 | 3.66 | 68.7% |
| UFA |  |  |  |
| 14:1 | 0.33 | 0.11 |  |
| 16:1 | 1.17 | 0.41 |  |
| 18:1 | 10.8 | 1.61 |  |
| 18:2 | 0.64 | 0.47 |  |
| 18:3 | 0.08 | — |  |
| TUFA | 13.02 | 2.6 | 80% |
| Chol. | 80.6 mg | 56.3 | 30% |

Molecular configuration of unsaturated acids.

|  | Raw Meat | | Product | |
| --- | --- | --- | --- | --- |
|  | cis | trans | cis | trans |
| 18:1 | 10.26 | 0.54 | 6.12 | — |
| 18:2 | 0.54 | 0.10 | 0.40 | 0.07 |

TABLE 11

Fatty acid composition of raw and processed extra lean ground beef by method 5.

| Meat | Raw 100 g | Product 80.6 g | Decrease in fat |
| --- | --- | --- | --- |
| Fat | 14.64 | 5.77 | 60.6% |
| SFA |  |  |  |
| 14:0 | 0.42 | 0.15 |  |
| 15:0 | 0.07 | 0.02 |  |
| 16:0 | 3.25 | 1.23 |  |
| 17:0 | 0.17 | 0.06 |  |
| 18:0 | 1.69 | 0.62 |  |
| TSFA | 5.6 | 2.08 | 62.8% |
| UFA |  |  |  |
| 14:1 | 0.41 | 0.05 |  |
| 16:1 | 0.54 | 0.21 |  |
| 18:1 | 6.05 | 2.32 |  |
| 18:2 | 0.47 | 0.24 |  |
| 18:3 | 0.03 | — |  |
| 20:4 | — | 0.04 |  |
| TUFA | 7.5 | 2.86 | 61.8% |
| Chol. mg | 67.8 | 57.8 | 14.7% |

Molecular configuration of unsaturated acids.

|  | Raw Meat | | Product | |
| --- | --- | --- | --- | --- |
|  | cis | trans | cis | trans |
| 18:1 | 5.36 | 0.69 | 2.54 | 0.34 |
| 18:2 | 0.41 | 0.06 | 0.26 | 0.00 |

TABLE 12

Fatty acid composition of raw & processed ground pork patties by method 5

| Meat | Raw 100 g | Product 58.2 g | Decrease in Fat |
| --- | --- | --- | --- |
| Fat, g | 27.43 | 10.8 | 60.6% |
| SFA |  |  |  |
| 14:0 | 0.37 | 0.14 |  |
| 15:0 | — | — |  |
| 16:0 | 6.42. | 2.42 |  |
| 17:0 | 0.08 | 0.03 |  |
| 18:0 | 3.6 | 1.37 |  |
| TSFA | 10.47 | 4.0 | 61.8% |

TABLE 12-continued

Fatty acid composition of raw & processed ground pork patties by method 5

| Meat | Raw 100 g | Product 58.2 g | Decrease in Fat |
|---|---|---|---|
| UFA | | | |
| 14:1 | — | — | |
| 16:1 | 0.72 | 0.48 | |
| 18:1 | 11.28 | 4.3 | |
| 18:2 | 2.55 | 0.93 | |
| 18:3 | 0.09 | 0.03 | |
| 20:1 | 0.21 | 0.07 | |
| TUFA | 14.85 | 5.61 | 62.2% |
| Chol. mg | 74.1 | 56.0 | 24.4% |

Molecular configuration of unsaturated fatty acids

| | Raw Meat | | Product | |
|---|---|---|---|---|
| | cis | trans | cis | trans |
| 18:1 | 11.24 | — | 7.40 | — |
| 18:2 | 2.55 | — | 1.60 | — |

The application of the methods of this invention is not limited to beef. The term meat includes all kinds and all cuts of edible raw meats from animals including fatty sea food such as fatty fish, shrimps, lobsters, poultry, goat, lamb, mutton, camel and processed meats like hams, hotdogs, sausages, frankfurters, salami, bologna, meat balls, patties, corned beef. Raw meat includes all cuts of meats, steaks and ground meats.

In the preceeding examples the methods of my invention have been illustrated with and without the addition of water to the meat to be heated, although the addition of some water appears to facilitate the mobilization and elimination of the fat from the raw meat. As the amount of added water increases the amount of fat extracted appears to decrease. In most instances adding more than 0.6 ml of water per gram of raw meat does not produce any benefit over additions of less than 0.6 ml per gram of raw meat.

Having now described preferred embodiments of my invention in accordance with the Patent Statutes, it is not intended that it be limited except as defined in the appended claims.

I claim:

1. A process for taking the saturated and unsaturated fat out of raw meats, raw ground meats and raw ground meat preparations while restoring the nutrients that flow out of the meat with the fat when the raw meat is heated consisting essentially of:
   a. heating said raw meat with 0.0 to about 0.6 ml of added water per gram of meat for a time and at a temperature of 95°–97° C. to form a meat juice and to allow the meat juice, containing saturated and unsaturated fat and nutrients from the heated meat, to flow out of the meat,
   b. separating the heated meat from the meat juice containing saturated and unsaturated fat and nutrients originally present in the raw meat,
   c. pouring the meat juice into a vessel wherein a fat layer containing saturated and unsaturated fat and an aqueous layer containing nutrients originally present in the meat are formed,
   d. separating said aqueous layer from said fat layer, and
   e. adding the separated aqueous layer thus obtained to the previously heated and separated meat to form a mixture and heating the resulting mixture gently at a temperature and for a time sufficient for all of the aqueous layer to be absorbed by the meat to produce a moist low fat meat product with a reduced fat content as compared to the original fat content of the raw meat.

2. The process of claim 1 wherein in step a the raw meat is heated in a pressure cooker at 109° to 121° C. under 5–15 psi for a time sufficient to form a meat juice.

3. The process of claim 1 in which in step a said raw ground meat and water are heated gently with occasional manual stirring, or continuous automatic stirring, to about 95°–97° C. and the mixture is then held for about two minutes at about 95°–97° C. to form a meat juice.

4. The process of claim 1 or 3 wherein the heated ground meat and the meat juice containing the saturated and unsaturated fat and the nutrients that flowed out of the meat are placed in a strainer lined with gauze or cheese cloth, the ground meat is pressed, 0.1 to 0.2 ml of hot water per gram of the raw ground meat is poured over the pressed ground meat, the pressed ground meat is pressed again and the liquid recovered is allowed to stand to form a layer of fat and an aqueous layer which is added back to the previously heated meat and heated gently to allow the meat to absorb the aqueous layer.

5. The process of claim 1 where the source of heat is electromagnetic radiation.

6. The process of claim 1 wherein the raw meats, raw ground meats, and raw ground meat preparations are placed in a covered dish, with up to 0.6 ml of added water, and heated by electromagnetic radiation at 625 to 700 Joules per second at a frequency of 2450 MHZ (microwave) for at least about one minute and then stirred or turned over to ensure proper mixing and even heating.

7. The process of claim 1 wherein the source of heat is microwave radiation.

* * * * *